US008379687B2

(12) United States Patent
Cybulski et al.

(10) Patent No.: US 8,379,687 B2
(45) Date of Patent: Feb. 19, 2013

(54) GAS DISCHARGE LASER LINE NARROWING MODULE

(75) Inventors: Raymond F. Cybulski, San Diego, CA (US); Robert A. Bergstedt, Carlsbad, CA (US); William N. Partlo, Poway, CA (US); Richard L. Sandstrom, Encinitas, CA (US); Gon Wang, Temecula, CA (US)

(73) Assignee: Cymer, Inc., San Diego, CA (US)

( * ) Notice: Subject to any disclaimer, the term of this patent is extended or adjusted under 35 U.S.C. 154(b) by 1739 days.

(21) Appl. No.: 11/173,955

(22) Filed: Jun. 30, 2005

(65) Prior Publication Data
US 2007/0002919 A1 Jan. 4, 2007

(51) Int. Cl.
*H01S 3/08* (2006.01)

(52) U.S. Cl. ............ 372/107; 372/55; 372/57; 372/102; 372/100

(58) Field of Classification Search .......... 372/55, 372/57, 102, 100, 107
See application file for complete search history.

(56) References Cited

U.S. PATENT DOCUMENTS

| 3,593,189 | A | 7/1971 | Buhrer | 331/94.5 |
|---|---|---|---|---|
| 3,989,360 | A | 11/1976 | Duchet | 350/319 |
| 4,223,279 | A | 9/1980 | Bradford, Jr. et al. | 331/94.5 |
| 4,455,658 | A | 6/1984 | Sutter, Jr. | 372/38 |
| 4,697,270 | A | 9/1987 | Galkowski | 372/34 |
| 4,798,467 | A | 1/1989 | Wyeth et al. | 356/349 |
| 4,817,101 | A | 3/1989 | Wyeth et al. | 372/32 |
| 4,823,354 | A | 4/1989 | Znotins et al. | 372/57 |
| 4,881,231 | A | 11/1989 | Jain | 372/32 |
| 4,883,352 | A | 11/1989 | Bruning | 353/122 |
| 4,940,331 | A | 7/1990 | Wyeth et al. | 356/349 |
| 4,959,840 | A | 9/1990 | Akins et al. | 372/57 |
| 5,023,884 | A | 6/1991 | Akins et al. | 372/57 |
| 5,025,445 | A | 6/1991 | Anderson et al. | 372/20 |
| 5,025,446 | A | 6/1991 | Kuizenga | 372/21 |

(Continued)

FOREIGN PATENT DOCUMENTS

| JP | 63217687 | 9/1988 |
|---|---|---|
| JP | 64-042564 | 2/1989 |

(Continued)

OTHER PUBLICATIONS

"Introduction to signal condition for ICP & charge piezoelectric sensors" website: www.pcb.com/techsignal.html, @ copyright PCD Piezotronics 1999.

*Primary Examiner* — Kinam Park
(74) *Attorney, Agent, or Firm* — Cymer, Inc.

(57) ABSTRACT

A line narrowed gas discharge laser system and method of operating same is disclosed which may comprise a dispersive center wavelength selective element; a beam expander comprising a plurality of refractive elements; a refractive element positioning mechanism positioning at least one of the refractive elements to modify an angle of incidence of a laser light beam on the dispersive center wavelength selection element; each of the dispersive center wavelength selection element and the beam expander being aligned with each other and with a housing containing at least the dispersive center wavelength selection element; a housing positioning mechanism positioning the housing with respect to an optical axis of the gas discharge laser system. The dispersive element may comprise a grating and the beam expander may comprise a plurality of prisms. The housing may contain the dispersive center wavelength selective element and the beam expander. The housing positioning element may comprise a position locking mechanism.

8 Claims, 10 Drawing Sheets

U.S. PATENT DOCUMENTS

| | | | | |
|---|---|---|---|---|
| 5,083,093 | A | 1/1992 | Adler et al. | 328/65 |
| 5,095,292 | A | 3/1992 | Masterton | 333/26 |
| 5,095,492 | A | 3/1992 | Sandstrom | 372/102 |
| 5,128,601 | A | 7/1992 | Orbach et al. | 372/30 |
| 5,189,678 | A | 2/1993 | Ball et al. | 372/28 |
| 5,315,611 | A | 5/1994 | Ball et al. | 372/56 |
| 5,371,587 | A | 12/1994 | De Groot et al. | 356/349 |
| 5,373,515 | A | 12/1994 | Wakabayashi et al. | 372/20 |
| 5,420,877 | A | 5/1995 | Sandstrom | 372/34 |
| 5,440,578 | A | 8/1995 | Sandstrom | 372/59 |
| 5,448,580 | A | 9/1995 | Birx et al. | 372/38 |
| 5,450,207 | A | 9/1995 | Fomenkov | 356/416 |
| 5,524,144 | A | 6/1996 | Suzuki | 359/176 |
| 5,656,882 | A | 8/1997 | Lazarus et al. | 310/328 |
| 5,691,989 | A | 11/1997 | Rakuljic | 372/20 |
| 5,706,301 | A | 1/1998 | Lagerstrom | 372/32 |
| 5,754,571 | A | 5/1998 | Endoh et al. | 372/20 |
| 5,770,933 | A | 6/1998 | Larson et al. | 318/254 |
| 5,771,258 | A | 6/1998 | Morton et al. | 372/57 |
| 5,802,094 | A * | 9/1998 | Wakabayashi et al. | 372/57 |
| 5,835,520 | A | 11/1998 | Das et al. | 328/65 |
| 5,848,089 | A | 12/1998 | Sarkar et al. | 372/58 |
| 5,852,621 | A | 12/1998 | Sandstrom | 372/25 |
| 5,852,627 | A | 12/1998 | Ershov | 372/108 |
| 5,870,420 | A | 2/1999 | Webb | 372/58 |
| 5,898,725 | A | 4/1999 | Fomenkov et al. | 372/102 |
| 5,953,360 | A | 9/1999 | Vitruk et al. | 372/87 |
| 5,978,394 | A | 11/1999 | Newman et al. | 372/32 |
| 5,978,405 | A | 11/1999 | Juhasz et al. | 372/57 |
| 5,978,409 | A | 11/1999 | Das et al. | 372/100 |
| 5,991,324 | A | 11/1999 | Knowles et al. | 372/57 |
| 6,005,879 | A | 12/1999 | Sandstrom et al. | 372/25 |
| 6,018,537 | A | 1/2000 | Hofmann et al. | 372/25 |
| 6,021,150 | A | 2/2000 | Partio et al. | 372/57 |
| 6,028,879 | A | 2/2000 | Ershov | 372/57 |
| 6,038,055 | A | 3/2000 | Hansch et al. | 359/279 |
| 6,067,311 | A | 5/2000 | Morton et al. | 372/57 |
| 6,078,599 | A | 6/2000 | Everage et al. | 372/20 |
| 6,094,448 | A | 7/2000 | Fomenkov et al. | 372/102 |
| 6,104,735 | A | 8/2000 | Webb | 372/58 |
| 6,109,574 | A | 8/2000 | Pan et al. | 248/176.1 |
| 6,128,323 | A | 10/2000 | Myers et al. | 372/38.1 |
| 6,163,559 | A | 12/2000 | Watson | 372/102 |
| 6,164,116 | A | 12/2000 | Rice et al. | 73/1.72 |
| 6,192,064 | B1 | 2/2001 | Algots et al. | 372/99 |
| 6,208,674 | B1 | 3/2001 | Webb et al. | 372/57 |
| 6,208,675 | B1 | 3/2001 | Webb | 372/58 |
| 6,212,217 | B1 | 4/2001 | Erie et al. | 372/102 |
| 6,219,368 | B1 | 4/2001 | Govorkov | 372/59 |
| 6,240,110 | B1 | 5/2001 | Ershov | 372/20 |
| 6,240,112 | B1 | 5/2001 | Partlo et al. | 372/57 |
| 6,243,405 | B1 | 6/2001 | Borneis et al. | 372/57 |
| 6,263,002 | B1 | 7/2001 | Hsu et al. | 372/6 |
| 6,317,447 | B1 | 11/2001 | Partlo et al. | 372/57 |
| 6,348,357 | B2 | 2/2002 | Sano | 438/16 |
| 6,404,158 | B1 | 6/2002 | Boisvert et al. | 318/469 |
| 6,477,193 | B2 | 11/2002 | Oliver et al. | 372/58 |
| 6,493,364 | B1 | 12/2002 | Baumier et al. | 372/15 |
| 6,493,374 | B1 | 12/2002 | Fomenkov et al. | 372/102 |
| 6,496,528 | B2 | 12/2002 | Titus et al. | 372/102 |
| 6,529,531 | B1 | 3/2003 | Everage et al. | 372/20 |
| 6,529,533 | B1 | 3/2003 | Voss | 72/29.01 |
| 6,532,247 | B2 | 3/2003 | Spangler et al. | 372/57 |
| RE38,054 | E | 4/2003 | Hofmann et al. | 372/25 |
| 6,650,666 | B2 | 11/2003 | Spangler et al. | 372/20 |
| 6,671,294 | B2 | 12/2003 | Kroyan et al. | 372/20 |
| 6,721,340 | B1 | 4/2004 | Fomenkov et al. | 372/25 |
| 6,738,410 | B2 | 5/2004 | Partlo et al. | 372/100 |
| 6,757,316 | B2 * | 6/2004 | Newman et al. | 372/57 |
| 6,760,358 | B1 | 7/2004 | Zimmermann et al. | 372/101 |
| 6,778,584 | B1 | 8/2004 | Partlo et al. | 372/99 |
| 6,853,653 | B2 | 2/2005 | Spangler et al. | 372/20 |
| 2002/0167986 | A1 | 11/2002 | Pan et al. | 372/55 |
| 2006/0114957 | A1 * | 6/2006 | Algots et al. | 372/55 |

FOREIGN PATENT DOCUMENTS

| | | |
|---|---|---|
| JP | 03-217062 | 9/1991 |
| JP | 04-305987 | 10/1992 |
| JP | 04-314374 | 11/1992 |
| JP | 04076976 | 11/1992 |
| JP | 05-167172 | 7/1993 |
| JP | 06-005952 | 1/1994 |
| JP | 06-021543 | 1/1994 |
| JP | 06-152007 | 5/1994 |
| JP | 10-284790 | 10/1998 |
| JP | 2000-058944 | 2/2000 |
| JP | 11-035615 | 8/2000 |
| JP | 2002-509363 | 3/2002 |
| RU | 2046482 | 10/1994 |
| WO | WO99/31773 | 6/1999 |

* cited by examiner

GAS DISCHARGE LASER LINE NARROWING MODULE

FIELD OF THE INVENTION

The present invention related to gas discharge laser systems, e.g., excimer and molecular fluorine gas discharge laser systems and particularly line narrowing modules for providing tuned narrow bandwidth for the output laser light pulse beam pulses.

RELATED APPLICATIONS

The present application is related to U.S. patent application Ser. No. 11/000,684, filed on Nov. 30, 2004, entitled, LINE NARROWING UNIT, the disclosure of which is hereby incorporated by reference. This application is also related to U.S. Pat. No. 6,757,316, entitled FOUR KHZ GAS DISCHARGE LASER, issued to Newman et al. on Jun. 29, 2004, and U.S. Pat. No. 6,778,584, entitled HIGH POWER GAS DISCHARGE LASER WITH HELIUM PURGED LINE NARROWING UNIT, issued to Partlo et al. on Aug. 17, 2004, and U.S. Pat. No. 6,795,474, entitled GAS DISCHARGE LASER WITH IMPROVED BEAM PATH, issued to Partlo et al. on Sep. 21, 2004, the disclosures of each of which are hereby incorporated by reference.

BACKGROUND OF THE INVENTION

In the past line narrowing modules for gas discharge laser systems of the type mentioned above have included a tuning optical element, e.g., a tuning mirror, e.g., an RMax mirror, which is applicants' assignee's designation for a tuning mirror having maximum reflectivity for the wavelength of the laser system, e.g., nominally 248 nm for a KrF laser system and 193 for an ArF laser system It will be understood by those skilled in the art that the "maximum reflectivity" applies generally the same across a relatively broad band of several hundred picometers ("pm") at which the laser system lases before being line narrowed in the line narrowing module, e.g., to about 0.12 pm full width half maximum ("FWHM") and about 0.3 pm for the integral of energy in the spectrum amounting to 95% of all energy about some center wavelength of the spectrum at about the peak, i.e., commonly referred to as E95% or simply E95.

Applicants assignee has proposed certain improvements to such laser systems currently available laser systems sold by applicants' assignee, e.g., in single chambered models, e.g., ELS 7XXX models and in dual chambered systems, e.g., master oscillator-power amplifier ("MOPA" systems, e.g., XLA-1XX and XLA-2XX systems available from applicants' assignee. These improvements are aimed at making bandwidth control and bandwidth stability more robust. The present application relates to aspects of embodiments of such improvements, e.g., to the above referenced application Ser. No. 11/000,684.

SUMMARY OF THE INVENTION

A line narrowed gas discharge laser system and method of operating same is disclosed which may comprise a dispersive center wavelength selective element; a beam expander comprising a plurality of refractive elements; a refractive element positioning mechanism positioning at least one of the refractive elements to modify an angle of incidence of a laser light beam on the dispersive center wavelength selection element; each of the dispersive center wavelength selection element and the beam expander being aligned with each other and with a housing containing at least the dispersive center wavelength selection element; a housing positioning mechanism positioning the housing with respect to an optical axis of the gas discharge laser system. The dispersive element may comprise a grating and the beam expander may comprise a plurality of prisms. The housing may contain the dispersive center wavelength selective element and the beam expander. The housing positioning element may comprise a position locking mechanism. The housing may comprise a front plate tilted by the housing positioning mechanism about a pivot point comprising a point of contact between a mounting mechanism and a portion of the front plate. The housing positioning mechanism may comprise a position holding mechanism.

DETAILED DESCRIPTION OF PREFERRED EMBODIMENTS

According to aspects of an embodiment of the present invention, applicants propose a resonator cavity alignment with a line narrowing module ("LNM") tilt and lock system. The optics in the LNM must be aligned to the rest of the resonator cavity to produce good beam profiles and efficient lasing. The line narrowing module ("LNM") is referred to as a module for convenience sake wherein such a "module" comprises at lease a housing containing one or more optical elements used for the purpose of selecting a center wavelength and, e.g., also narrowing the bandwidth (line narrowing). The line narrowing module, so referenced in many prior patents of applicants' assignee, may or may not be modular in the strictest sense(s) of the dictionary definition(s). Applicants' assignee may, e.g., manufacture and intend its line narrowing modules ("LNMs") to be modular in the sense of standardized and with more or less (within manufacturing tolerances and such) identical components, e.g., for ease of manufacture and assembly, installation and test, and also, e.g., replacement in the field, the term "module" in the context of the present application and accompanying claims should be understood to cover a mechanism, e.g., performing the function(s) attributed herein and in the prior art to the center wavelength and/or bandwidth selection, maintenance and/or stability, whether or not a part of a "module" or in a modular form or configuration.

If the grating is tilted, the optical axes of the prism assembly and the grating can become misaligned. This can, e.g., negatively impact beam profiles, output energy and the bandwidth output of the laser, whether a single oscillator resonant cavity laser such as applicants assignee's ELS-7XXX series laser products or a dual chambered laser system, e.g., with a master oscillator and power amplifier ("MOPA") laser system, such as applicants' assignee's XLA-1XX and XLA-2XX series laser systems. According to aspects of an embodiment of the present invention, applicants propose that by tilting the whole LNM, alignment between the prism assembly and grating is maintained while at the same time, the angle and position of the laser light beam on the grating may be suitably adjusted, e.g., in the short axis of the beam, e.g., where the short axis illuminates the grating in the longitudinal length of the grating. The tilt mechanism according to aspects of an embodiment of the present invention can be lockable in order to maintain the alignment position over a long period of time or when the line narrowing module is removed and or replaced.

The LNM can be attached to an L-bracket mounting on a laser system three bar mount on the frame supporting the laser system components, e.g., at three points, two lower and one upper. In currently existing configurations, e.g., in the laser systems such as noted above, the LNM may be bolted at these three positions. To allow for tilt of the LNM, the top mounting point can be replaced with an adjustable mount with a locking feature. The two lower mounts can then be designed to pivot about a horizontal axis. The adjustment feature can use the existing bolt with the addition, e.g., of a jack screw adjusting nut. The adjustment mechanism may have a locking feature.

Figure 1:
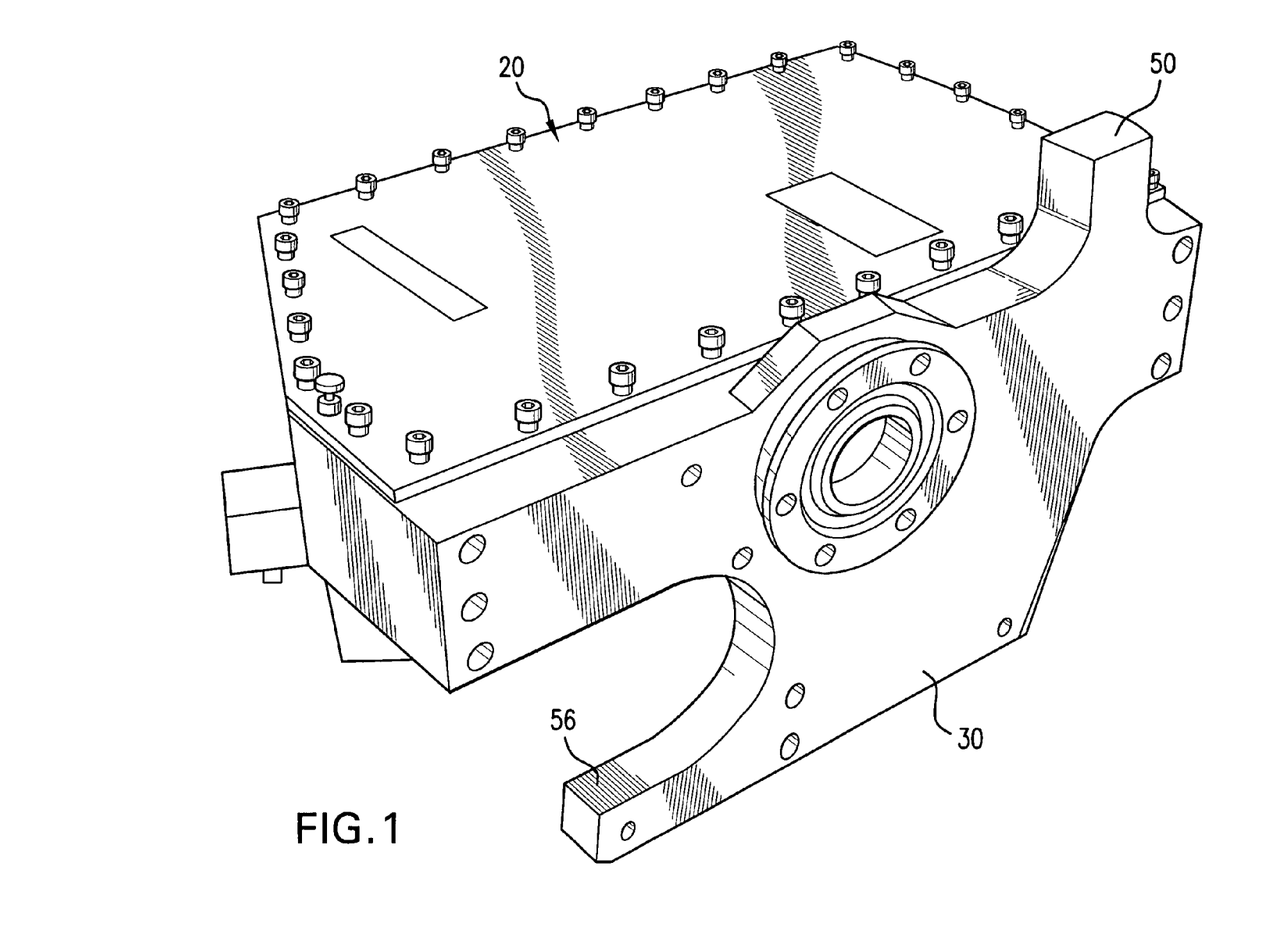
FIG. 1 shows a perspective orthogonal view of a example of a line narrowing module ("LNM") housing and front plate.
Figure 2:
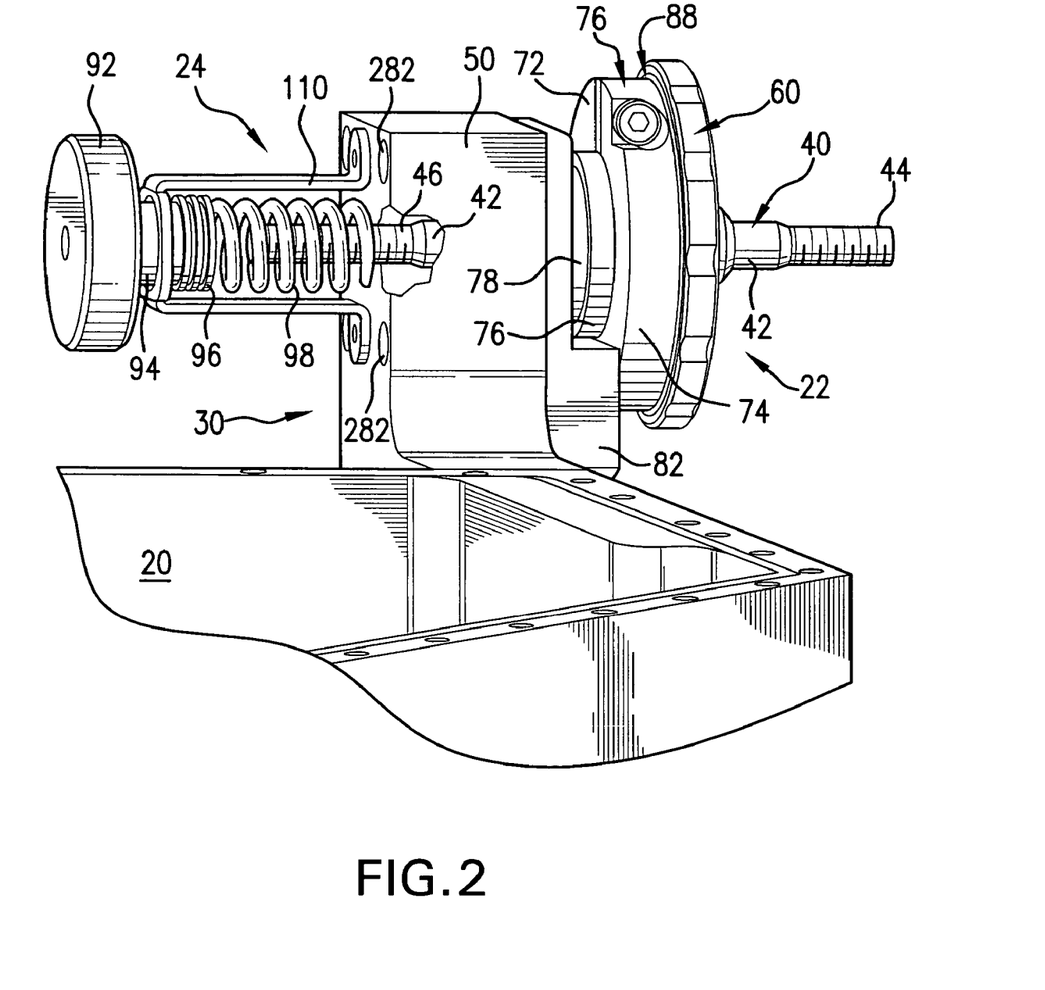
FIG. 2 shows a perspective view of an embodiment of the present invention.
Figure 3:
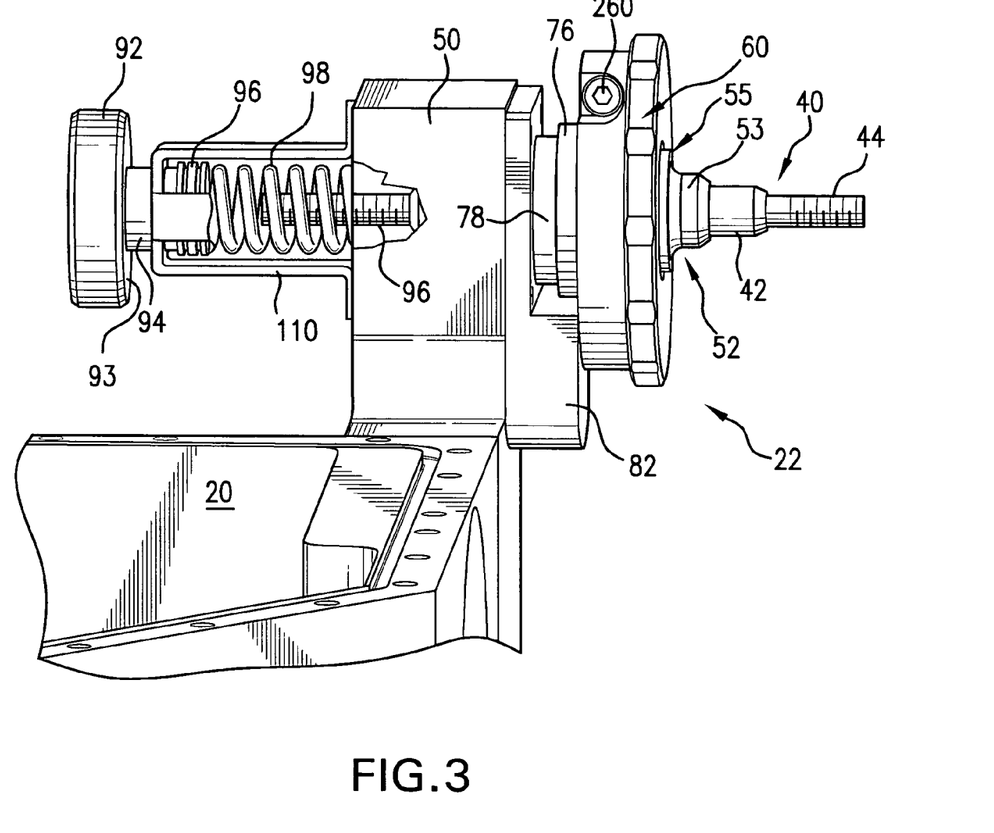
FIG. 3 shows a second perspective view of the embodiment of FIG. 1.
Figure 4:
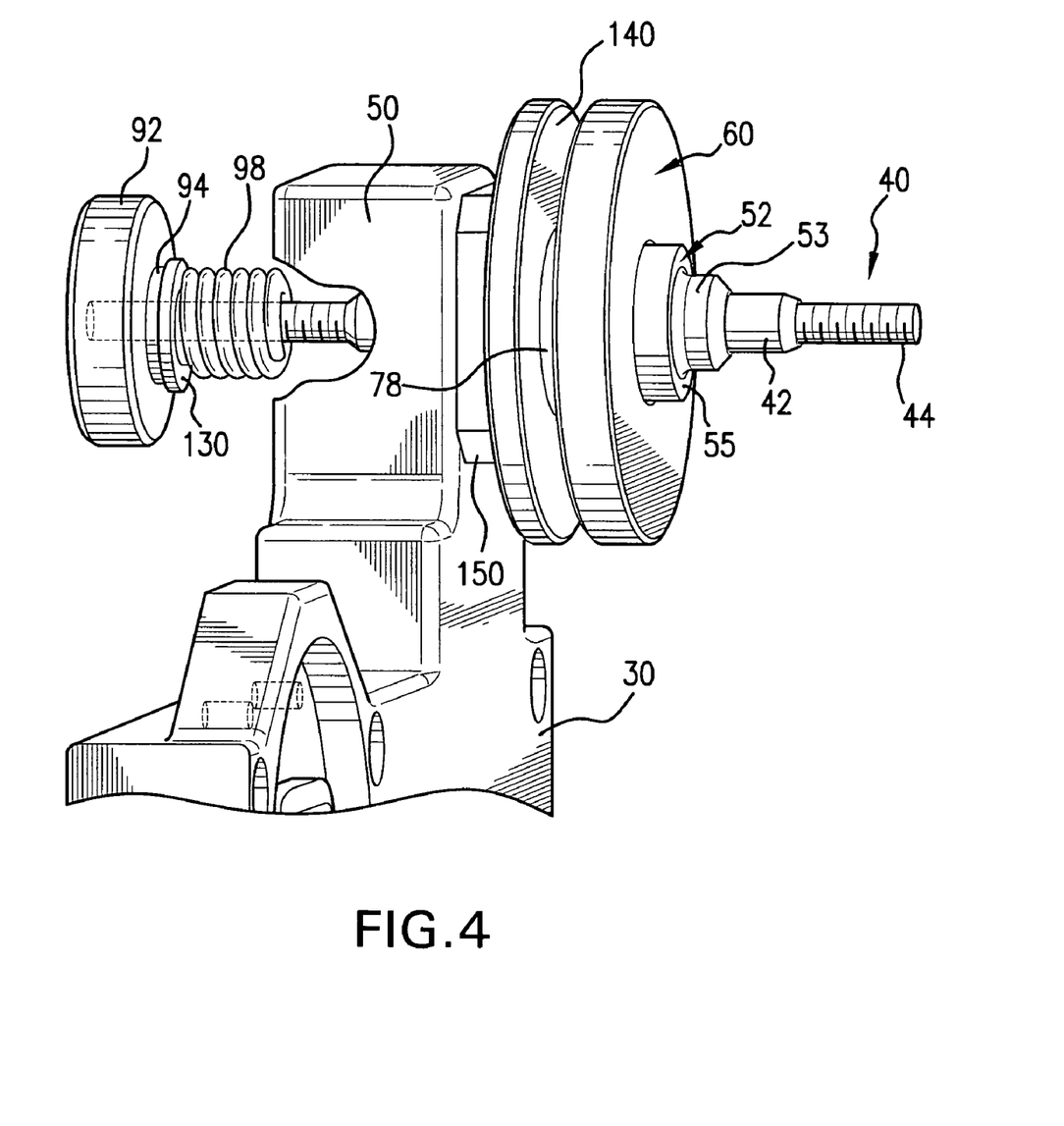
FIG. 4 shows a perspective view of another embodiment of the present invention.

Turning now to FIG. 1 there is shown a perspective orthogonal view of a example of a line narrowing module ("LNM") housing 20. The line narrowing module housing 20 may have a front mounting plate 30. As shown in FIG. 1 the front mounting plate 30 may be bolted to a front wall of the line narrowing module housing 20, as also shown in FIG. 4, or, as shown in FIGS. 2 and 3, the front mounting plate may be integral with the housing 20 or mounted to a side wall of the housing 20.

According to aspects of an embodiment of the present invention an LNM alignment apparatus 22 may be attached to a portion 50 of the front mounting plate 30, which may also be attached to, e.g., by bolts (not shown) or made integral with the front plate or the LNM housing 20. The alignment apparatus 22 may have a shaft 40 passing through the portion 50 of the mounting bracket 30, e.g., in the same place as an existing attachment shaft in existing LNM mounting bracket is positioned and used to connect the LNM mounting front plate to a frame which supports the various laser system modules, as is known in the art. In existing laser system LNM's the shaft 40 may extend through the protruding portion 50 and a standoff between the portion 50 and an attachment or L-bracket (not shown) mounted to the laser system frame and defines a distance between the attachment bracket and the front mounting plate 30. Alternatively the shaft 40 at the standoff 52 end could be threaded directly into, e.g., an end of a mounting bar, e.g., attached to and aligned to the laser system frame (not shown), and therefore generally aligned to, e.g., the laser chamber portion of the resonator cavity.

The shaft 40 may have a smooth cylindrical body 42 and the L-bracket mounting end threads 44 and holding end threads 46, with the smooth shaft and perhaps some portion of the holding end threads extending through the hole in the L-bracket protrusion portion 50. The shaft 40 may also extend through an opening in a stand-off 52. As was the case in the existing attachment mechanism, the standoff may have a standoff nipple 53 that may be fitted into a matching opening in the attachment bracket (not shown) for positioning and alignment purposes with an abutting surface on the attachment bracket (not shown) abutting an abutting surface 55 on the standoff 52.

Figure 6:
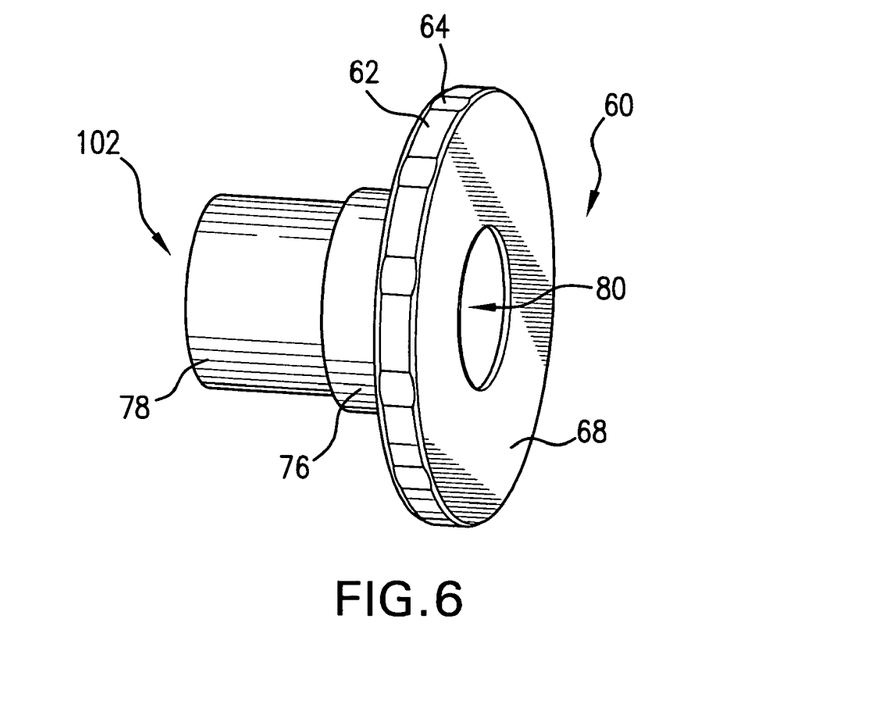
FIG. 6 shows a perspective view of an adjusting nut used in the embodiment of FIGS. 1 and 2.
Figure 7:
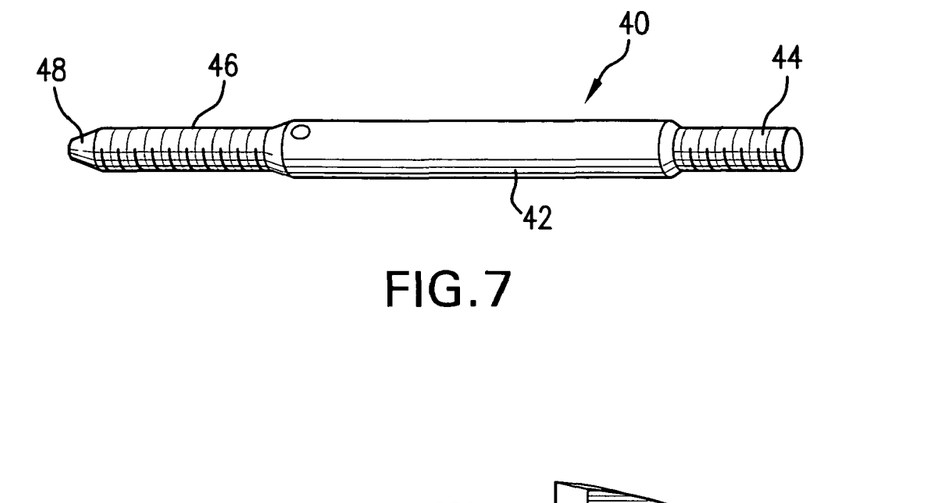
FIG. 7 shows a perspective view of a shaft used in the embodiments of FIGS. 2-4.
Figure 8:
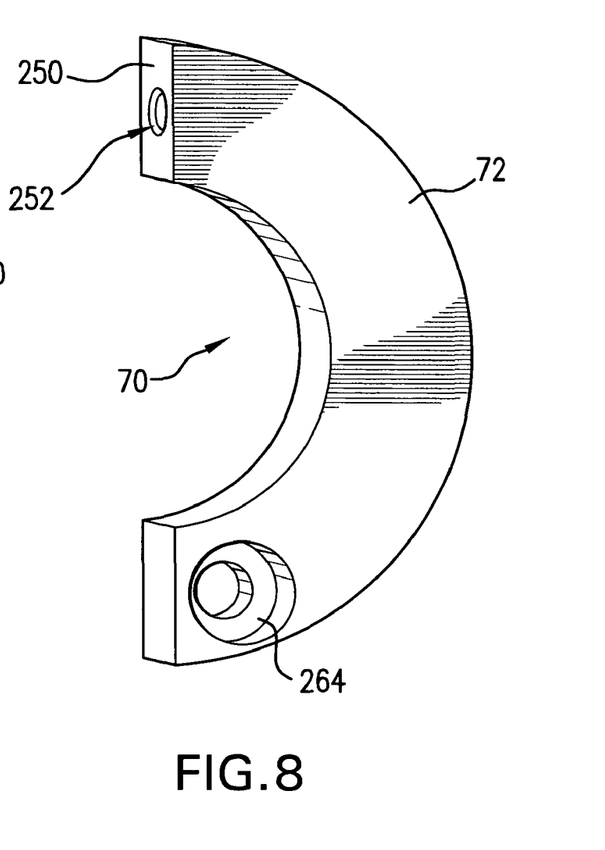
FIG. 8 shows a portion of a locking mechanism used in the embodiment of FIGS. 2 and 3.

An adjusting nut 60 may also extend onto the standoff 52 by having the standoff 52 inserted into an adjusting nut opening 80, shown in FIG. 6. The adjusting nut may have a rim surface 62, with spaced apart gripping depressions 64. The adjusting nut 60 may have a circular front face 68.

Figure 5:
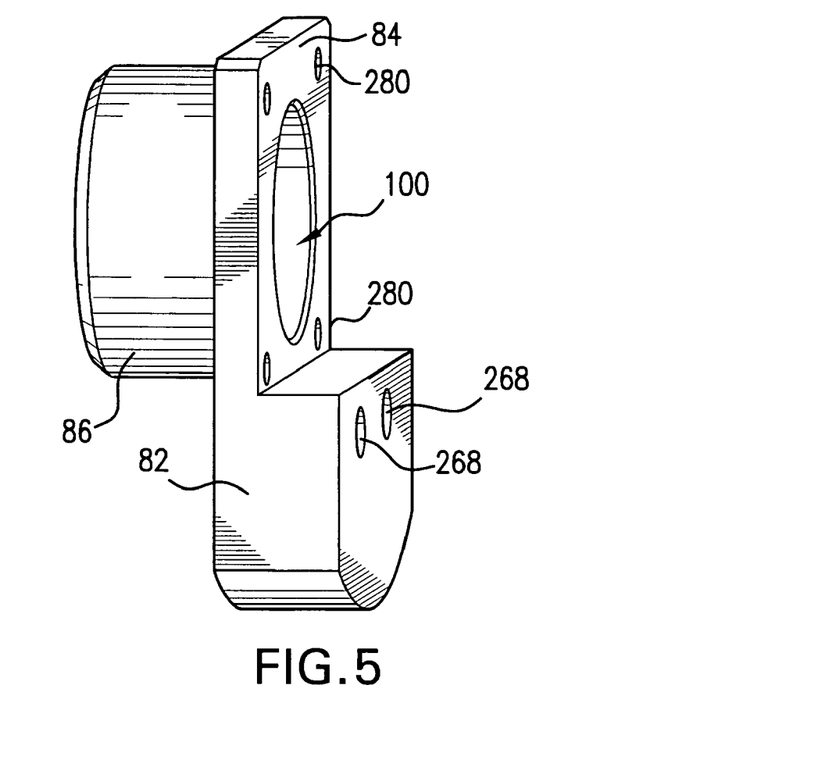
FIG. 5 shows a perspective view of a bushing used in the embodiment of FIGS. 1 and 2.
Figure 9:
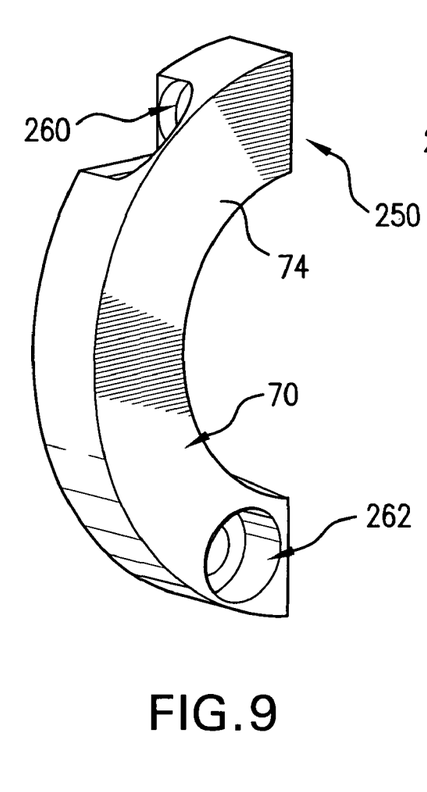
FIG. 9 shows another portion of a locking mechanism used in the embodiment of FIGS. 2 and 3.

A locking mechanism 70, which may comprise a clamping half 72 and a clamping half 74 may be bolted together by a clamping half connection bolt (not shown) inserted through a clamping half connection bolt opening 260, shown in FIG. 9 and threaded into clamping half connection bolt receiving threads (not shown) in an opening 252, such that the respective clamping half junction faces 250 are drawn toward each other and/or held together in a locked mode, with the clamping half 72 and clamping half 74 engaging a locking cylinder portion 76 of the adjustment nut 60 and held in place against a bushing 82, shown in perspective view in FIG. 5, by clamping portion attachment nuts (not shown). The nuts may attach through clamping half attachment nut openings 262 and 264 and be received in threaded clamping half attachment nut receiving holes 268 on the bushing 82. These nuts (not shown) may be configured so that the respective clamping half 72, 74 can rotate about the respective connecting nut (not shown).

A threaded cylinder 78 extending from the locking mechanism cylinder 76, along with the locking mechanism cylinder 76 may extend a cylindrical opening 80 in the adjusting nut 60 for receiving the standoff 52, which may extend within the opening 80 and into the cylindrical opening 100 in the bushing 82. The bushing may have a cylindrical portion 86 extending into an opening (not shown) in the portion 50 of the front mounting plate 30. The bushing 82 may have a front face 84.

Figure 10:
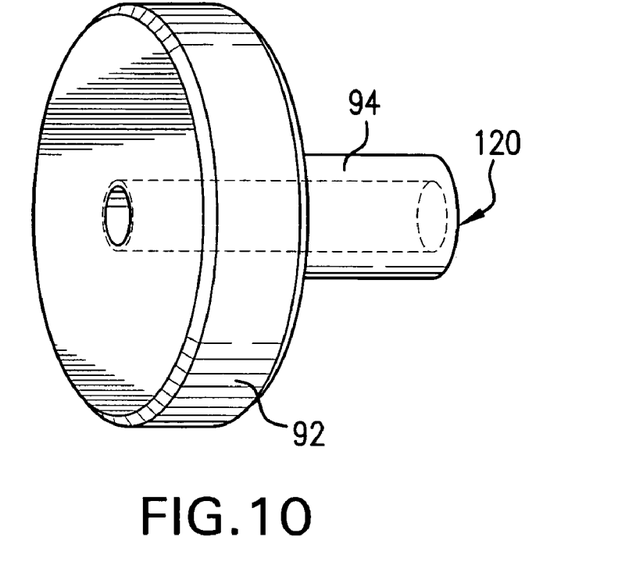
FIG. 10 shows a holding nut used in the embodiments of FIGS. 2-4.

A holding nut 92, having a holding nut shaft 94 and a holding nut engagement face 93 may be attached, by suitable means, e.g., welding or a threaded engagement, to a bearing 96. The bearing 96 may also be attached by suitable means, e.g., welding or by a slot (not shown) formed on the face of the bearing 96 to a holding mechanism coil spring 98. The holding nut 92 may be mounted with the holding spring 98 in a holding nut frame 110. The holding nut 92 may have a threaded internal shaft passage 120, shown in FIG. 10, which receives the threaded end 46 of the shaft 42, within a holding nut cylinder 94.

Figure 12:
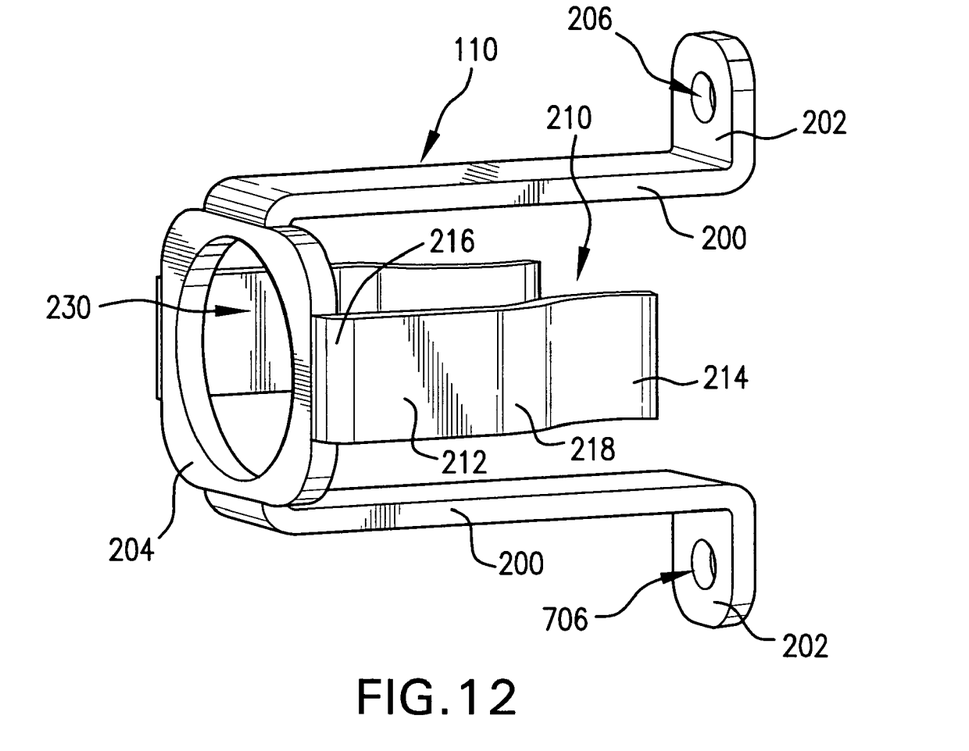
FIG. 12 shows a perspective view of a holding nut retainer mounting used in the embodiment of FIGS. 2 and 3.

As shown in FIG. 12. the holding nut frame 110 may have a pair of holding nut frame legs 200, 202 each of which may have at one end a holding nut leg foot 202, 204. The holding nut 92 may be inserted into a holding nut top piece 204 through a holding nut opening 230. The holding nut frame 110 may be attached to the protruding portion 50 of the front plate 30 by bolts (not shown) inserted through bolt openings 206 in the feet 206.

A holding nut spring passage 210 may be defined between a pair of leaf springs 212, each of which may have a leaf spring engaging portion 214, a leaf spring extender portion 212, a rounded portion 216 between the top piece 204 and the extender 212 and a rounded portion 218 between the extender 212 and the engaging portion 210, which may engage the coil spring 98. The holding nut frame 110 and leaf springs could be replaced with a simple cylinder housing the coil spring 98.

Figure 11:
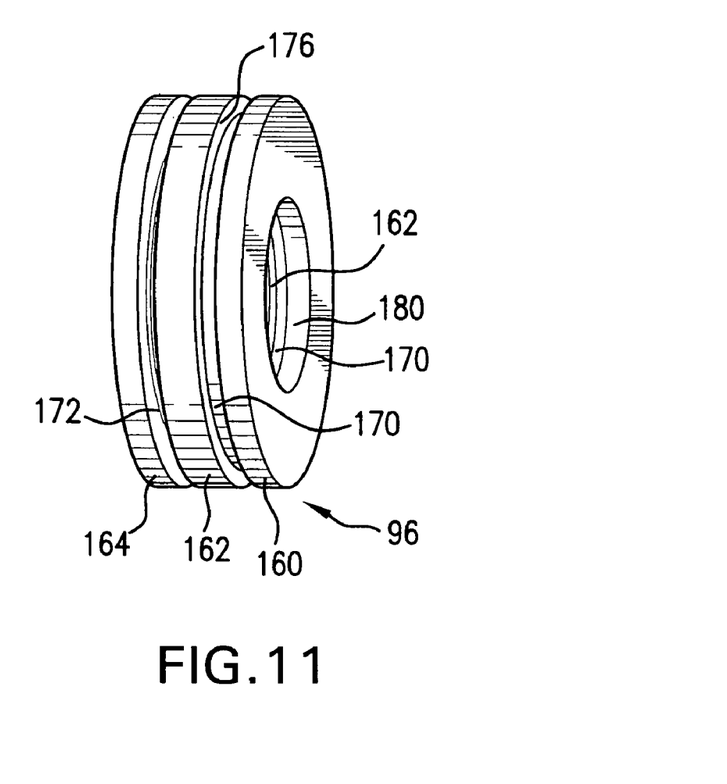
FIG. 11 shows a perspective view of a bearing used in the embodiment of FIGS. 2 and 3.
Figure 15:
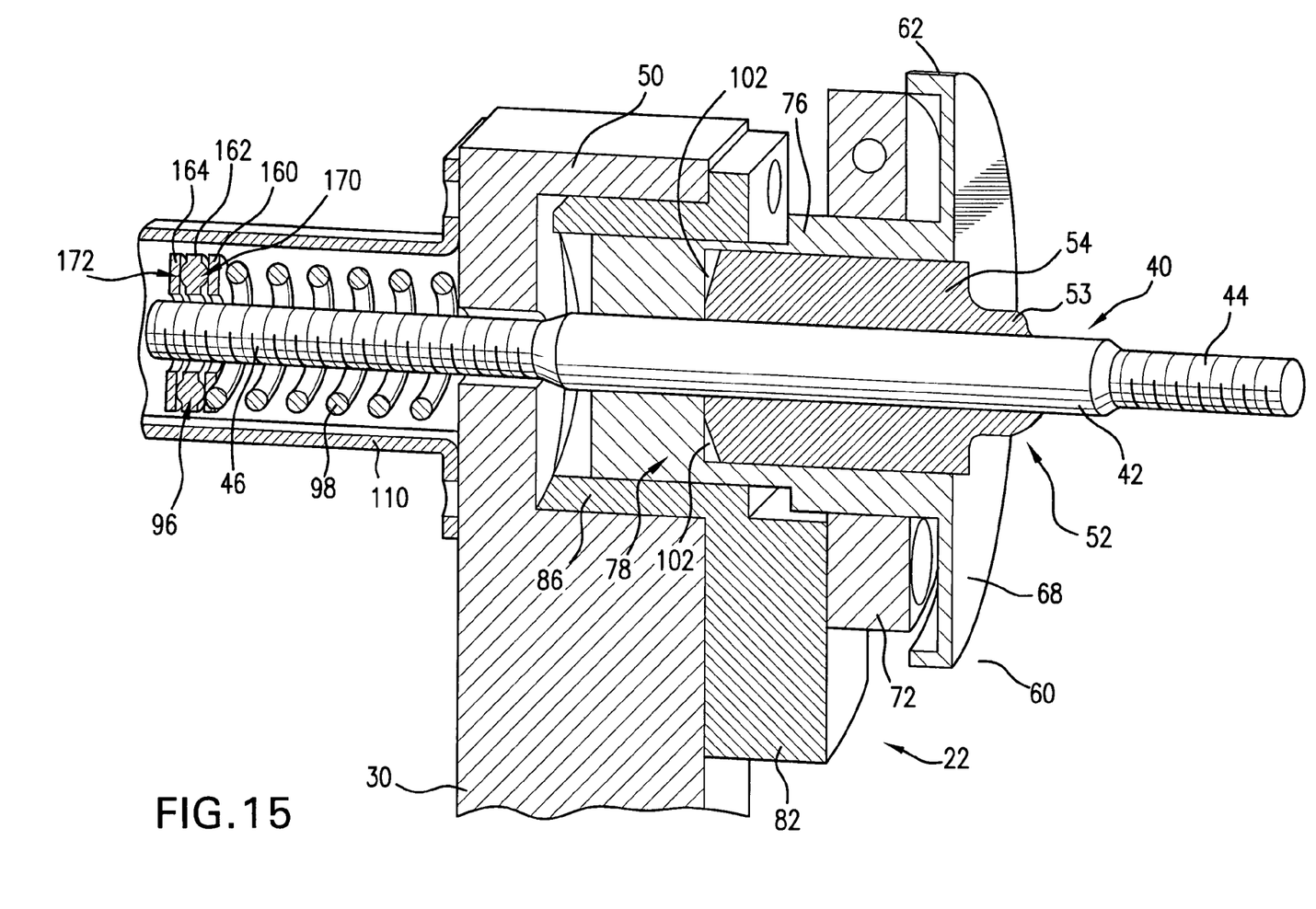
FIG. 15 shows a cross-sectional view of the embodiment of FIGS. 2 and 3

As shown in more detail in FIGS. 11 and 15, the bearing 96 may have a cylindrical spring-side bearing plate or washer 160, which as noted above may be attached to the coil spring 98. The bearing 96 may also have a bearing central washer 162 and a cylindrical holding nut side bearing plate or washer 164, which may in turn be attached by suitable means to the holding nut 92, or be engaged by, e.g., a flange (not shown) on the holding nut 92. The central bearing washer may have generally semi-cylindrical annular bearing protrusion 170, 172, which may be formed, e.g., by a bead weld formed on the bearing central washier 162. Also shown in FIG. 11 is a bearing hollow opening 180, through which extends the shaft threaded end 46.

The bearing 96 will be understood to prevent the coil spring 98 from rotating as the holding nut 94 is tightened, to apply holding force to the protruding portion 50 of the front plate 30 after the adjusting nut 60 has been positioned to obtain the desired tilt of the LNM housing 20.

It will also be understood that in operation, when the adjusting nut 60 is rotated, its threaded portion 78 engages the threads (not shown) on the inside wall of the opening 100 in the bushing 82 and moves the bushing 82 toward the adjusting nut 60. The threads may be set with a relatively fine pitch, e.g., about 56 threads/in, or about 0,014 mm between threads, in order to finely adjust the tilt of the LNM housing 20 for accurate enough alignment of the optics in the housing 20 to the rest of the gas discharge laser system cavity (not shown). The adjusting nut can be held in place vis-a-vis the threaded end 44 of the shaft 40, which is attached, e.g., to an L-bar mounting which is part of or connected to the laser system frame (not shown), by the standoff 52 abutting a flange 102 on the end of the threaded portion 78 of the adjusting nut 60. The standoff 52 may in turn be held in place relative to the mounting, e.g., L-bar mounting, by the threaded and 44 being threaded into the mounting and the nipple 52 of the standoff fitting into a corresponding opening, e.g., in the 1-bar mounting. Therefore, the standoff 52 is held in its axial position vis-a-vis the threaded end 44 and therefore the laser system frame (not shown), and also, therefore the laser system resonator cavity) by attachment to the shaft 40 and the adjustment nut 60 is prevented from moving axially along the shaft 40 by the cylindrical wall of the standoff 52 engaging the flange 102 on the end of the threaded portion 78 of the adjusting nut. Turning the adjusting nut thus moves the bushing 82 in one direction or the other in relation to the adjusting nut 60.

Once in the desired tilting position to achieve the desired alignment, the two halves 72, 74 of the locking break 70 may be tightened against the break receiving portion 76 of the adjusting nut 60 by tightening the bolt 260, shown in FIG. 3 to prevent further rotation of the adjusting nut 60.

Thereafter, the holding nut 92 may be tightened to apply force through the holding nut frame 110 to the protruding portion 50 of the front plate 30 to keep the LNM housing 20 from moving from the selected tilt position, e.g., due to vibration when the laser system is in operation. Once the holding nut 92 is fully threaded in to its secured position there is a hard metal contact, e.g., between the holding nut engaging surface 93 and the holding nut frame 110 and, thereafter the coil spring 98 is of no further effect.

Figure 13:
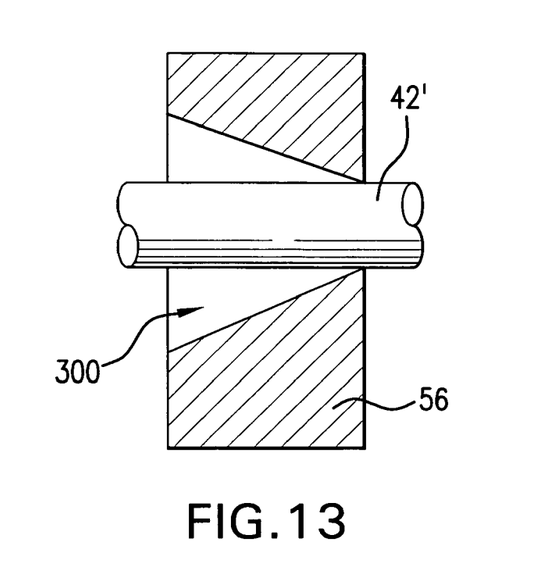
FIG. 13 shows a cross sectional view of a portion of an LNM front mounting plate according to aspects of the embodiments of FIGS. 2-4.

As shown in FIG. 13, partly in cross-section, the front plate 30 lower portion 56 may be modified to accommodate the tilting of the front plate 30 and the LNM housing 20 with respect to a mounting bolt shaft 42'. The opening in the lower portion 56 of the front plate 30 may be machined out to form a generally conically shaped opening 300 which may intersect a non-threaded surface of the bolt at or near the front of the portion 56 of the front plate 30, allowing the front plate to be relatively firmly positioned with respect to the bolt 42' while at the same time able to tilt enough for alignment of the optics in the LNM housing 20 with the laser cavity optical path. The amount of tilting needed is relatively minor, e.g., about 10 mrad.

Shown in FIG. 4 is an illustration of aspects of an embodiment of the present invention. In this embodiment, the adjusting nut 60 only has a threaded cylindrical portion 78, which extends into a threaded cylindrical inner portion of the bushing 150. In this embodiment, the locking break may comprise an additional locking nut which is threadedly engaging the threaded surface 78 and rotatable until it engages a surface of the bushing to hold the bushing and thus the LNM housing 20 in place. The holding nut 92 is also modified to not include the holding nut frame 110 or bearing 96 shown in FIGS. 2 and 3 and simply has a coil spring engaging flange 130.

Figure 14:
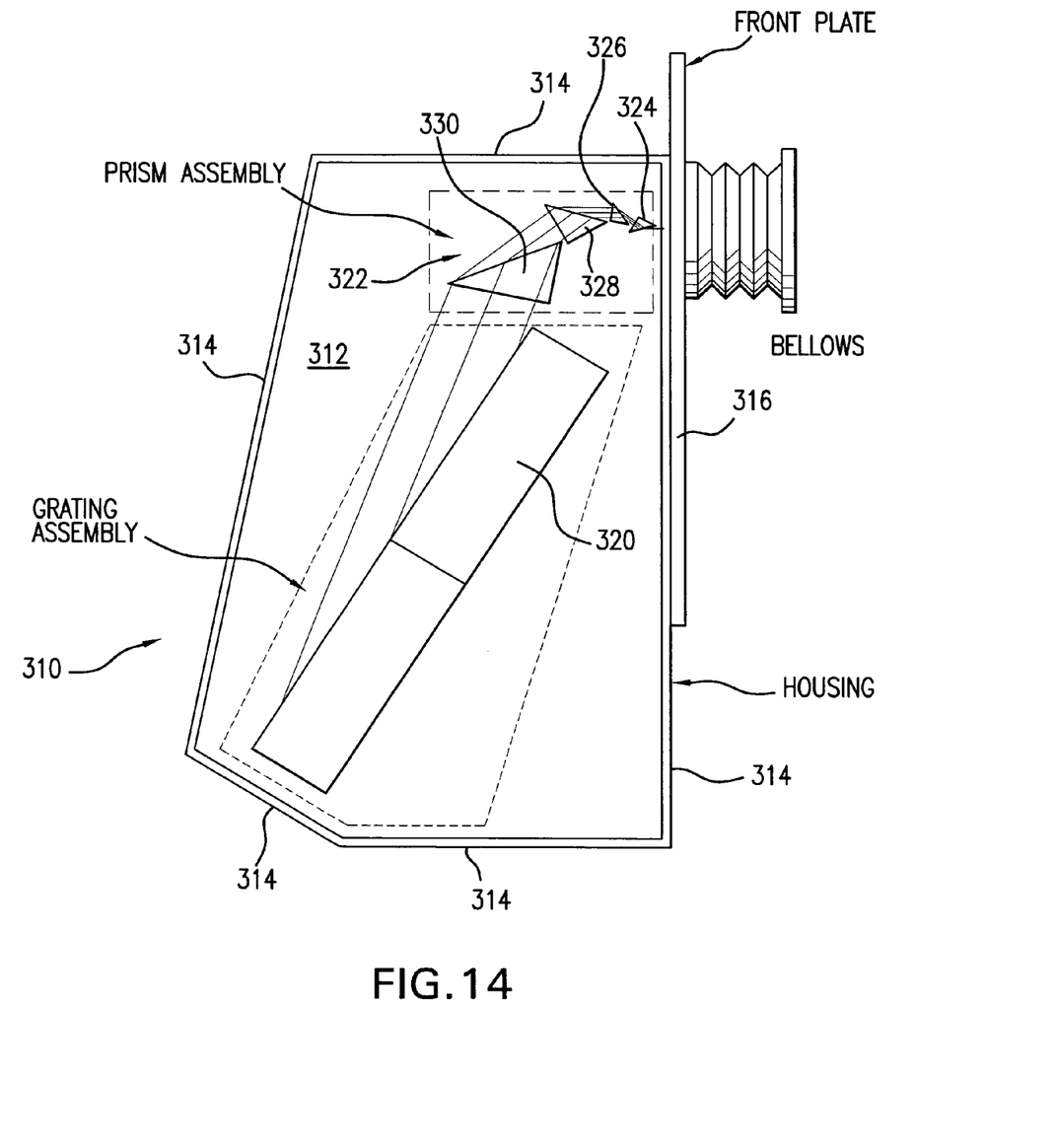
FIG. 14 shows an illustrative example of a gas discharge laser system comprising a line narrowing module with which aspects of embodiments of the present invention are useful.

Turning now to FIG. 14 there is shown a FIG. from the above referenced co-pending patent application showing a line narrowing module 310 which may comprise a housing 312 having housing walls 314 to one of which may be attached or integrally formed with a front plate 316. The LNM 310 may contain a dispersive optical center wavelength selecting element, such as a grating 320. The grating 320 may be illuminated by a pulse of laser light from a pulsed gas discharge laser, e.g., an ArF, KrF, XeF, XeCl, $CO_2$ or the like gas discharge laser creating pulses of laser output light expanded in a beam expander 322. The beam expander 322 may be completely inside the housing 312, as shown, and may comprise a plurality, e.g., four, prisms 324, 326, 328, 330. One or more of the prisms may be partly or totally outside of the housing, but fixedly mounted in alignment with each other and the grating and the housing 312, such that tilting the housing will not disturb the alignment between the grating 320 and the elements of the beam expander 322. Such an embodiment of an LNM is without a wavelength selection tuning mechanism in the form of a fast turnable mirror, such as an Rmax as contained in prior laser systems sold by applicants' assignee, e.g., ELS 6XXX and 7XXX or XLA-1XX laser systems. The fast tuning mechanism, according to its position in the path of the laser light pulse beam, changes the angle of incidence of the beam on the grating, e.g., an eschelle grating in a Littrow configuration, to thereby change the selected center wavelength of the laser output light beam output by the laser system utilizing such an LNM. In the past, this fast tuning mirror has been conveniently used to properly align the LNM and its components to the optical axis of the rest of the laser resonance cavity, without the need to disturb the alignment of the LNM components, the grating and prisms vis-a-vis each other. Without the Rmax in the LNM sub-system, either or both of the grating 320 and/or one or more of the beam expander 322 or one of the beam expander's prisms 324, 326, 328, 330, can be aligned to the laser resonance cavity optical axis, but only with great difficulty in also maintaining the necessary alignment of the grating and beam expander elements to each other.

It will be understood by those skilled in the art that a line narrowed gas discharge laser system and method of operating same is disclosed which may comprise a dispersive center wavelength selective element; a beam expander comprising a plurality of refractive elements; a refractive element positioning mechanism positioning at least one of the refractive elements to modify an angle of incidence of a laser light beam on the dispersive center wavelength selection element; each of the dispersive center wavelength selection element and the beam expander being aligned with each other and with a housing containing at least the dispersive center wavelength selection element; a housing positioning mechanism positioning the housing with respect to an optical axis of the gas discharge laser system. The dispersive element may comprise a grating and the beam expander may comprise a plurality of prisms. The housing may contain both the dispersive center wavelength selective element and the beam expander. The housing positioning element may comprise a position locking mechanism, such as the locking brake or locking nut disclosed above. The housing may comprise a front plate tilted by the housing positioning mechanism about a pivot point comprising a point of contact between a mounting mechanism and a portion of the front plate, such as is shown in FIG. 13 which maintains the positioning and alignment of the front plate, and thus also the housing, in two axes, but allows for tilting in one axis by a sufficient amount to align the housing and the optic contained within and/or aligned to the housing to the rest of the laser system resonance cavity. The housing positioning mechanism may comprise a position holding mechanism such as the above described holding nut and coil spring assembly.

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art. In additions to changes and modifications to the disclosed and claimed aspects of embodiments of the present invention(s) noted above the following could be implemented.

While the particular aspects of embodiment(s) of the Gas Discharge Laser Line Narrowing Module described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present Gas Discharge Laser Line Narrowing Module is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act".

We claim:

1. A line narrowed gas discharge laser system comprising
a dispersive center wavelength selective element;
a beam expander comprising a plurality of refractive elements;
a refractive element positioning mechanism positioning at least one of the refractive elements to modify an angle of incidence of a laser light beam on the dispersive center wavelength selection element;
each of the dispersive center wavelength selection element and the beam expander being aligned with each other and with a housing containing at least the dispersive center wavelength selection element;
a housing positioning mechanism positioning the housing with respect to an optical axis of the gas discharge laser system, whereby the housing positioning element comprises a position locking mechanism and the housing comprising a front plate tilted by the housing positioning mechanism about a pivot point comprising a point of contact between a mounting mechanism and a portion of the front plate.

2. The apparatus of claim 1 further comprising:
the dispersive element comprises a grating.

3. The apparatus of claim 1 further comprising:
the beam expander comprises a plurality of prisms.

4. The apparatus of claim 2 further comprising:
the beam expander comprises a plurality of prisms.

5. The apparatus of claim 1 further comprising:
the housing containing the dispersive center wavelength selective element and the beam expander.

6. The apparatus of claim 2 further comprising:
the housing containing the dispersive center wavelength selective element and the beam expander.

7. The apparatus of claim 3 further comprising:
the housing containing the dispersive center wavelength selective element and the beam expander.

8. The apparatus of claim 4 further comprising:
the housing containing the dispersive center wavelength selective element and the beam expander.

* * * * *